US010580156B2

(12) United States Patent
Baker et al.

(10) Patent No.: US 10,580,156 B2
(45) Date of Patent: Mar. 3, 2020

(54) SYSTEM AND METHOD FOR MEASURING GEOMETRIC CHANGE IN A SUBTERRANEAN STRUCTURE

(71) Applicant: Mine Vision Systems, Inc., Pittsburgh, PA (US)

(72) Inventors: L. Douglas Baker, Pittsburgh, PA (US); Scott M. Thayer, Pittsburgh, PA (US); Paul G. Lucey, Gwelup (AU); Damien G. Roberts, Yokine (AU)

(73) Assignee: Mine Vision Systems, Inc., Pittsburgh, PA (US)

( * ) Notice: Subject to any disclaimer, the term of this patent is extended or adjusted under 35 U.S.C. 154(b) by 7 days.

(21) Appl. No.: 15/714,484

(22) Filed: Sep. 25, 2017

(65) Prior Publication Data
US 2018/0089852 A1 Mar. 29, 2018

Related U.S. Application Data

(60) Provisional application No. 62/399,023, filed on Sep. 23, 2016.

(51) Int. Cl.
G06T 7/00 (2017.01)
G06T 7/60 (2017.01)
(Continued)

(52) U.S. Cl.
CPC ............... *G06T 7/60* (2013.01); *G06T 7/246* (2017.01); *G06T 7/50* (2017.01); *G06T 17/10* (2013.01);
(Continued)

(58) Field of Classification Search
CPC .. G06T 7/60; G06T 7/50; G06T 7/246; G06T 17/10; G06T 2207/10012; G06T 2207/30184; H04N 5/23229; H04N 5/247
See application file for complete search history.

(56) References Cited

U.S. PATENT DOCUMENTS 7,069,124 B1 6/2006 Whittaker et al.
8,089,390 B2 1/2012 Jones et al.
(Continued)

FOREIGN PATENT DOCUMENTS

WO 2014/149802 A1 9/2014

OTHER PUBLICATIONS

International Search Report and Written Opinion for PCT/US2017/053255, dated Dec. 20, 2017 (12 pages).

*Primary Examiner* — Ping Y Hsieh
(74) *Attorney, Agent, or Firm* — K&L Gates LLP

(57) ABSTRACT

A system for measuring geometric change in a subterranean structure. The system includes an apparatus communicably couplable to a computing system. The apparatus is couplable to a mobile platform and includes a sensor configured to acquire data representative of a geometry of the subterranean structure and/or a camera configured to capture images of an interior of the subterranean structure, and a processing circuit. The computing system includes at least one processor, a 3D generator module configured to generate a digital three-dimensional model of the subterranean structure, an anchor module configured to define a plurality of digital anchors associated with the subterranean structure; a movement determination module configured to determine a movement of at least one of the digital anchors, and a movement classification module configured to determine a type of movement within the subterranean structure based on the determined movement of the at least one of the digital anchors.

20 Claims, 8 Drawing Sheets

(51) Int. Cl.
*G06T 7/246* (2017.01)
*G06T 7/50* (2017.01)
*G06T 17/10* (2006.01)
*H04N 5/247* (2006.01)
*H04N 5/232* (2006.01)

(52) U.S. Cl.
CPC ............... *G06T 2207/10012* (2013.01); *G06T 2207/30184* (2013.01); *H04N 5/23229* (2013.01); *H04N 5/247* (2013.01)

(56) References Cited

U.S. PATENT DOCUMENTS

| | | | |
|---|---|---|---|
| 8,633,699 B2 | 1/2014 | Linscott et al. | |
| 8,655,632 B2 | 2/2014 | Moguchaya | |
| 2006/0221072 A1* | 10/2006 | Se | G01C 11/06 |
| | | | 345/420 |
| 2015/0281881 A1* | 10/2015 | Appleby | E21C 39/00 |
| | | | 715/848 |

* cited by examiner

SYSTEM AND METHOD FOR MEASURING GEOMETRIC CHANGE IN A SUBTERRANEAN STRUCTURE

CROSS-REFERENCE TO RELATED APPLICATIONS

This application claims the benefit under 35 U.S.C. § 120 of the earlier filing date of U.S. Provisional Patent Application No. 62/399,023 filed on Sep. 23, 2016, titled SYSTEM AND METHOD FOR MEASURING GEOMETRIC CHANGE IN A SUBTERRANEAN STRUCTURE, the contents of which are hereby incorporated by reference in their entirety.

BACKGROUND

This application discloses an invention which is related, generally and in various aspects, to a system and method for measuring geometric change in a subterranean structure. Although the subterranean structure can be any type of subterranean structure (e.g., a mine, a tunnel, a cave, a bunker, a conduit, etc.), for purposes of simplicity, the subterranean structure will be described hereinafter in the context of a mine.

One type of geometric change is convergence, which is also called squeezing or closure. Convergence is a natural process in underground mining that can be defined as the measurable closure within a cross-section of an excavated space. Closure is a natural action of the remaining rock under pressure that is modulated by its mechanical properties and features. The presence of squeezing indicates a level of instability that can lead to large scale deformation, and in some cases, complete loss of structural integrity and collapse within the area of concern.

Since squeezing is a geometric contraction of a cross-section of an excavated space, it can be measured via direct geometric measurements within the cross-section of the excavated space. In some instances, squeezing is deemed to have occurred if the geometric measurement is reduced by 10 centimeters over the operational lifetime of the given excavated space. Alternative definitions indicate the presence of convergence in areas of the mine that exhibit stress exceeding 2%. Stress, in this case, is expressed as engineering strain, which is the ratio of the applied load to the original cross-sectional area.

Another type of geometric change is subsidence, which is a shifting of layers of the earth's surface downwards with respect to gravity. It is usually manifested as a pit or trough in form. With respect to underground mining, subsidence is usually caused by the collapse of underground structure beneath the subsiding layer. This phenomenon can be planned or unplanned. In block cave mining the formation of a pit on the surface of the mine is part of the mine development process. In other cases, the unplanned or unexpected collapse of underground structures can lead to the subsidence in the layers of the earth above the collapse. Subsidence can occur suddenly and catastrophically as rapid convergence, or it can develop more slowly over time. In complex mines, such as multi-layer block cave mines, production in a lower layer may cause subsidence in the layer adjacent and above it within the mine.

Underground mines are intricate structures that can move in complex ways that cannot be described completely by concepts such as convergence or subsidence. For example, convergence and subsidence could be happening within the same general area of the mine where the measurements are taking place. Isolated measurements in the cross-section will do a poor job of discriminating between the components of the measurement that can be attributed to convergence and the components of the measurements that should be attributed to subsidence. In the worst case, an insufficient program of measurements could lead to complete misclassification of the phenomena underlying the measured changes.

More generalized forms of mine movement are not constrained to linear combinations of subsidence and convergence. More complex forms of ground movement that involve mechanical concepts like torsion of a non-uniform medium under stress and other generalized forms of distortion are present to varying degrees within underground excavations. The more complex the form of motion or distortion manifested by the underlying phenomena, the less likely simple cross-section measurements are to be able to identify, classify, or even measure the underlying geotechnical issues manifested as movement within the cross-section.

Current best practice for detecting and measuring ground movement in underground mining is the use of an extensometer. An example of an extensometer is shown in FIG. 1. An extensometer is an engineering measurement device capable of making precision measurements of length that are useful for stress-strain analysis. Extensometers can come in contact or non-contact (laser and video, for example) varieties. In underground mining, it is common practice to make repeated extensometer measurements from within a cross-section of an area of concern within a mine. By making repeated measurements from the same area at different times, incremental measurements of ground movement are obtained. Geo-technical engineers analyze time-series of these displacement measurements in order to improve ground support and ideally prevent any unwanted collapse of an area of the mine.

Extensometers are often custom designed to provide a precise measurement for the type of movement that is assumed to be present within an area. If the actual ground movement differs from the assumed model, then a precision measurement is made and applied to the wrong ground movement model. At best, this practice leads to the incurring of additional and potentially unnecessary ground support that increases the overall cost to a mining operation. In the worst case, significant ground movement events are misclassified inviting catastrophe.

U.S. Pat. No. 7,069,124 to Whittaker et al., titled "Robotic Modeling of Voids", describes a system for the mapping and inspection of underground voids in two or three dimensions. A preferred embodiment of the invention disclosed therein includes a method for mapping subterranean voids such as, for example, caves, tunnels, bunkers and conduits. The method includes the following subprocesses: preprocessing, ingress/deployment, void modeling, mapping and navigation, exploration, conveying payloads other than void modeling sensors, stowing/egress and post processing.

International Application Publication No. WO 2013170348 to Tesman, Inc., titled "Mapping of Mining Excavations", describes an apparatus that includes at least two cameras and is suitable for installation on a mine excavation vehicle. The apparatus and methods disclosed therein concern the generation of three-dimensional (3D) models, or digital representations, of mining excavations. An embodiment of the invention disclosed therein includes an installation of the apparatus on a mining vehicle as well as use of the apparatus in the act of controlling at least one operation of the vehicle.

U.S. Pat. No. 8,164,473 to Roy, Jr., titled "Mine Roof Monitoring Apparatus", describes a contact measurement apparatus for measuring subsidence in underground mines. An embodiment of the invention shown in FIG. 1 is a first contact member in contact with a roof of the mine and a second contact member in contact with a floor of the floor. A measurement device is attached to one of the contact members to enable the measurement device to measure any change of the separation between the roof and the floor. In another embodiment, the contact members are capable of expanding or contracting to enable the measuring device to continue to make measurements after subsidence has occurred.

U.S. Pat. No. 4,514,905 to Lutzens, titled "Convergence Extensometer for Measuring Mine Roof Subsidence", describes a contact extensometer device which measures changes in the distance between a mine roof and a mine floor to determine mine roof subsidence. An embodiment of the contact extensometer device includes a pair of telescoping members secured via a spring in tension and an indicator that is capable of measuring the movement of the telescoping members. One of the members is attached to roof of the mine and is in vertical alignment with the other member that is attached to the floor of the mine. The indicator includes a pair of flanges, or lugs, which can be attached to each of the telescoping members fixed to the mine roof and floor.

U.S. Pat. No. 3,894,427 to Schuermann et al., titled "Device for Measuring Changes in Converging Rock Formations in a Mining Cavity", describes a device for monitoring and measuring changes in converging rock formations within a mining cavity. The device includes an elongated tube affixed via adhesive into bore holes drilled into opposite walls of the mining cavity. The tube contain a series of strain gages that are internally recessed and axially spaced at intervals along the tube. The invention disclosed therein enables the detection of changes within a rock formation that is surrounding the mining cavity with a single anchor. Furthermore, measurements of convergence are obtained by mounting two coaxial anchors on opposite sides of the mining cavity.

China Patent Application No. 103791802, titled "Underground Tunnel Two-Side Convergence and Deformation Electronic Measurement Device and Method", describes a device which includes a fixed two-sided displacement detecting device, a deformation sensing device and a data collection device.

Canadian Patent Application No. 2019894, titled "Mine Convergence Monitor", describes an apparatus which includes an optical head which is mounted to a fixed point on the mine wall, a target reflector which is mounted on another portion of the mine wall and facing the optical head, and a time domain reflectometer for measuring the time taken to transmit a beam of light between the optical head and the target reflector. The apparatus also includes means for deriving the distance between the target reflector and the optical head from the previously mentioned transmission time. It also discloses a means for determining convergence by comparison and subtraction of a prior measurement to a current measurement to the same optical head and target reflector as mounted in the same relative positions on the wall.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
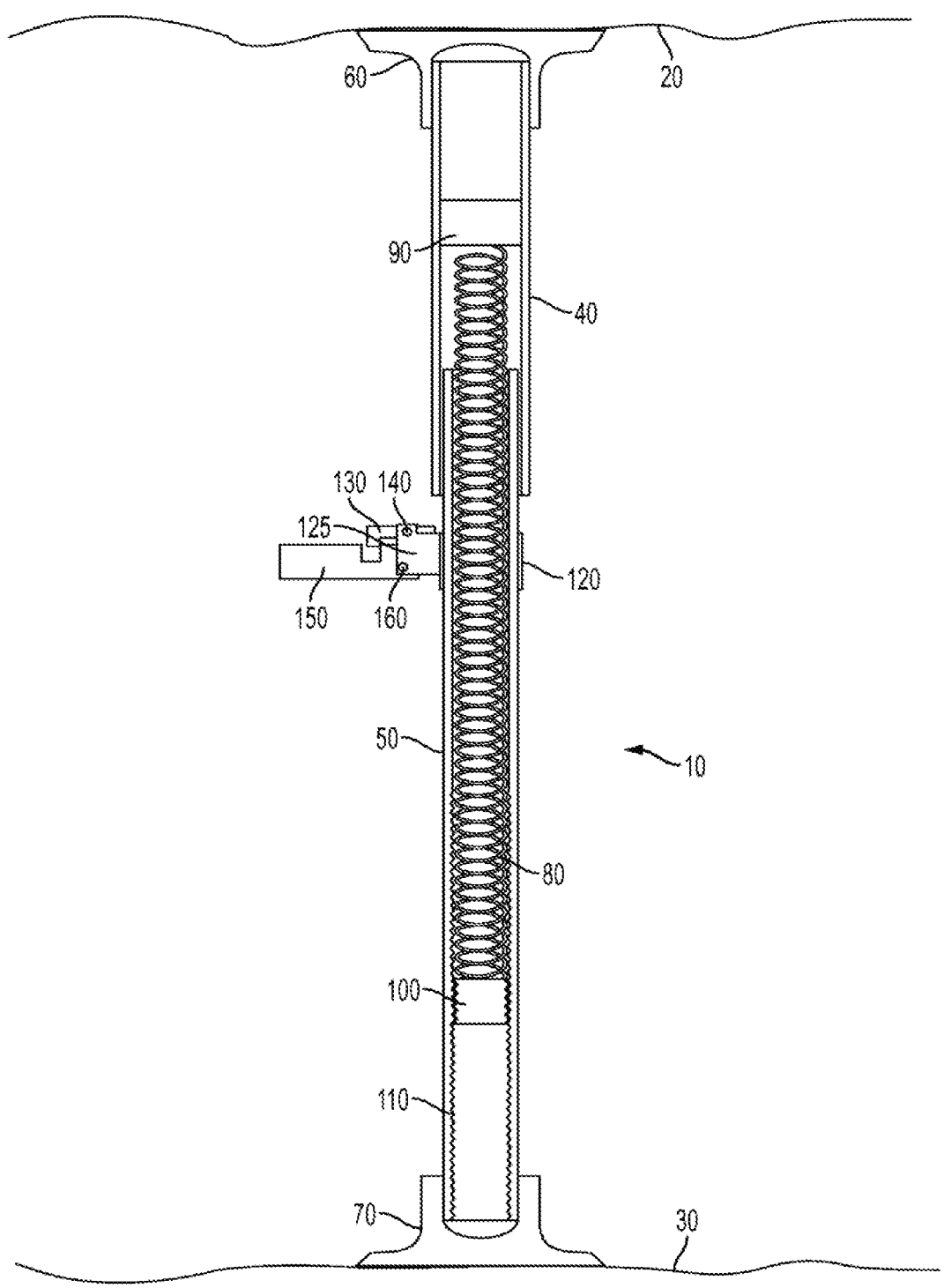
FIG. 1 illustrates a prior art extensometer.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the system and method in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the system and method disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

As described in more detail hereinbelow, aspects of the invention may be implemented by a computing device and/or a computer program stored on a computer-readable medium. The computer-readable medium may comprise a disk, a device, and/or a propagated signal.

Figure 2:
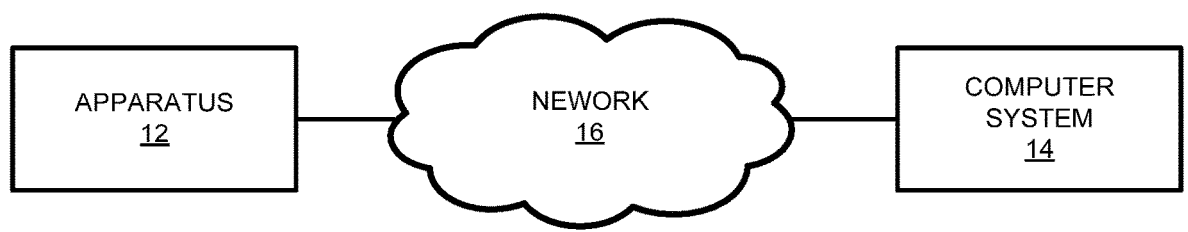
FIG. 2 illustrates various aspects of a system for measuring convergence, subsidence and movement in an underground mine.

FIG. 2 illustrates various aspects of a system 10 for measuring convergence, subsidence and movement in an underground mine. As shown in FIG. 2, the system 10 includes an apparatus 12 communicably connected to a computing system 14 via a network 16. The network 16 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 16 may include elements, such as, for example, intermediate nodes, proxy servers, routers, switches, and adapters configured to direct and/or deliver data. In general, the apparatus 12 may be structured and arranged to communicate with the computer system 14 via the network 16 using various communication protocols (e.g., HTTP, TCP/IP, UDP, WAP, WiFi, Bluetooth) and/or to operate within or in concert with one or more other communications systems.

The computing system 14 may include any number of computing devices communicably connected to one another. The computing system 14 may include any suitable type of computing device (e.g., a server, a desktop, a laptop, etc.) that includes one or more processors. Various aspects of the computing system 14 are described in more detail hereinbelow with respect to FIGS. 4 and 5.

Figure 3:
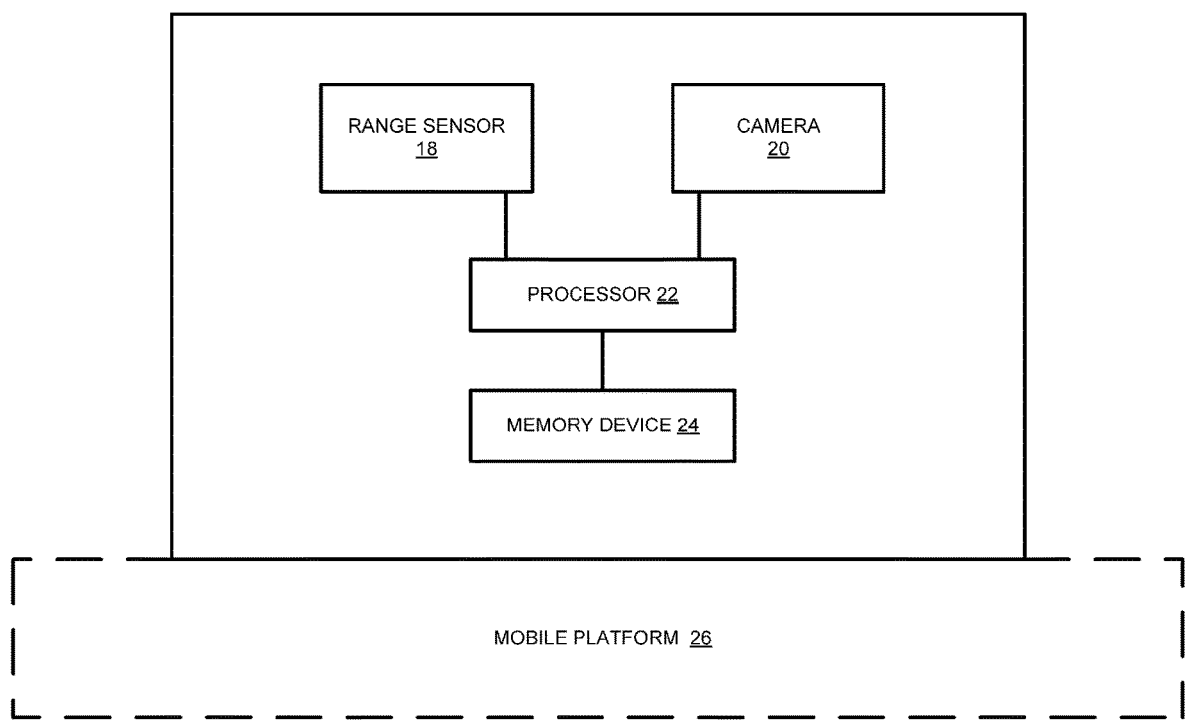
FIG. 3 illustrates various aspects of an apparatus of the system of FIG. 2.

FIG. 3 illustrates various aspects of the apparatus 12. The apparatus 12 includes a range or distance-measuring sensor 18 and/or a camera 20, a processor or processing circuit 22 communicably connected to the range sensor 18 and/or the camera 20, and a memory device 24 communicably connected to the processor 22. Stated differently, various aspects of the apparatus 12 include both the range sensor 18 and the camera 20, other aspects of the apparatus 12 include the range sensor 18 but not the camera 20, and yet other aspects of the apparatus 12 include the camera 20 but not the range sensor 18. For purposes of simplicity, the processor or processing circuit 22 will be described hereinafter in the context of a processor.

Although only one range sensor 18, one camera 20, one processor 22 and one memory device 24 are shown in FIG. 3 for purposes of simplicity, it will be appreciated that the apparatus 12 may include any number of these components. For example, according to various aspects, the apparatus 12 includes a plurality of cameras 20. Also, although not shown in FIG. 3 for purposes of simplicity, according to various aspects the computing system 14 (or the functionality of the computing system 14) is incorporated into the apparatus 12.

According to various aspects, the range sensor 18 includes a laser rangefinder such as a light detection and ranging (LIDAR) module, a radar module, an ultrasonic ranging module, a sonar module, a ranging module using triangulation or any other device able to acquire data representative of the geometry of the mine. The laser rangefinder emits a physical signal and receives a reflected physical signal. The emitted signals and the reflected signals can be, for example, light beams, electromagnetic waves, acoustic waves or the like. According to various aspects, by scanning the mine in a two-dimensional plane X, Y (where X is a first direction, Y is a second direction which is not collinear with X, and the directions X and Y form coordinate axes) while rotating around a third direction Z which is perpendicular to the first and the second directions, the laser rangefinder can acquire data which is representative of the three-dimensional geometry of the mine. Examples of types of 3D scans which can be secured by the range sensor 18 include point clouds, wireframes, spatially registered image sequences (either absolute or relative registration), and/or textured or textured meshes. Based on the orientation of the range sensor 18 and data indicative of emitted signals and the reflected signals (e.g., the time of emission of the emitted signal and the time of reception of the reflected signal), the processor 22 can compute, for a plurality of different points of the mine, both a distance from the range sensor 18 to the different points and respective angles (relative to a reference) between the range sensor 18 and the different points. The memory device 24 can store the acquired data and the processor 22 can process the acquired data as set forth in more detail hereinbelow.

According to various aspects, the range sensor 18 includes an internal coordinate frame which allows for subsequent scans to be easily aligned with or registered against the original scan of a given area of the mine. Additionally, the position of each range sensor 18 can be dynamically adjusted relative to its internal coordinate frame in order to assist in the scanning of a given area of the mine. For aspects which include more than one range sensor 18, each range sensor 18 may include a unique range sensor identification which can be stored in the memory device 24 along with distance and/or angle measurements associated with the given range sensor 18.

The apparatus 12 may include any number of cameras 20. In general, the camera 20 or cameras 20 operate to capture images of various parts of the interior of the mine. Each camera 20 may be any suitable type of camera. For example, according to various aspects, the apparatus 12 includes a single camera 20 which includes a single lens (e.g., a single lens camera) and is configured to capture a two-dimensional image of the interior of the mine. According to other aspects, the apparatus 12 includes two or more lenses (e.g., a stereo camera) and is configured to capture a three-dimensional image of the interior of the mine. According to yet other aspects, the apparatus 12 includes multiple cameras 20 which are utilized to capture two-dimensional images of the interior of the mine from different positions/angles/orientations, thereby allowing for the captured images to be subsequently utilized to reconstruct the geometry of the mine. According to yet other aspects, the apparatus 12 includes multiple cameras 20 which utilize structured light (e.g., structured light 3D scanner) to allow for the geometry of the mine to be reconstructed. Data indicative of the two-dimensional images and/or the three-dimensional images can be processed by the processor 22 and can be stored at the memory device 24.

As set forth above, the processor 22 is configured to process the acquired range sensor data and/or the camera data. According to various aspects, the processor 22 is configured to time stamp the acquired range sensor data and/or the camera data. According to various aspects, the processor 22 is configured to utilize the time stamps to time synchronize the acquired range sensor data and/or camera data. According to various aspects, the processor 22 is configured to utilize the acquired range sensor data and/or the camera data to generate an electronic/digital three-dimensional representation of the mine.

According to various aspects, the apparatus 12 also includes additional sensors, etc. and the processor 22 includes the additional functionality to determine the ego-motion estimate (position and orientation estimates) of each of the cameras 20 by analyzing the images captured by the cameras 20 and/or information output by the additional sensors. The determined ego-motion can include incremental and multi-frame motion estimation from monocular or multi camera systems. In an instance where a bad pose occurs, the bad pose can be detected and rejected based on the incremental motion estimation. Additionally, according to various aspects, the processor 22 and/or the processor 28 are configured to perform bundle adjustment on the determined ego-motion estimates to improve their accuracy. Furthermore, similar to the above-described dynamic adjustment of the range sensors 18, in various aspects the processor 22 and/or the processor 28 are configured to dynamically control adjustment of the lighting and camera exposures to obtain optimal images for the ego-motion estimates.

In general, the apparatus 12 is mounted to, attached to and/or carried by a mobile platform 26 (shown in dashed lines in FIG. 3) which travels throughout an underground mine. The mobile platform 26 can be, for example, a human, an autonomous robot, a wheeled vehicle driven by a human, a wheeled cart pushed by a human, etc. As the mobile platform 26 travels throughout the mine, the apparatus 12 acquires range sensor data, camera data and/or other data representative of the mine. Thus, the acquired range sensor data, camera data and/or other data can be considered "mobile" data. The acquired data can be stored in the memory device 24.

Figure 4:
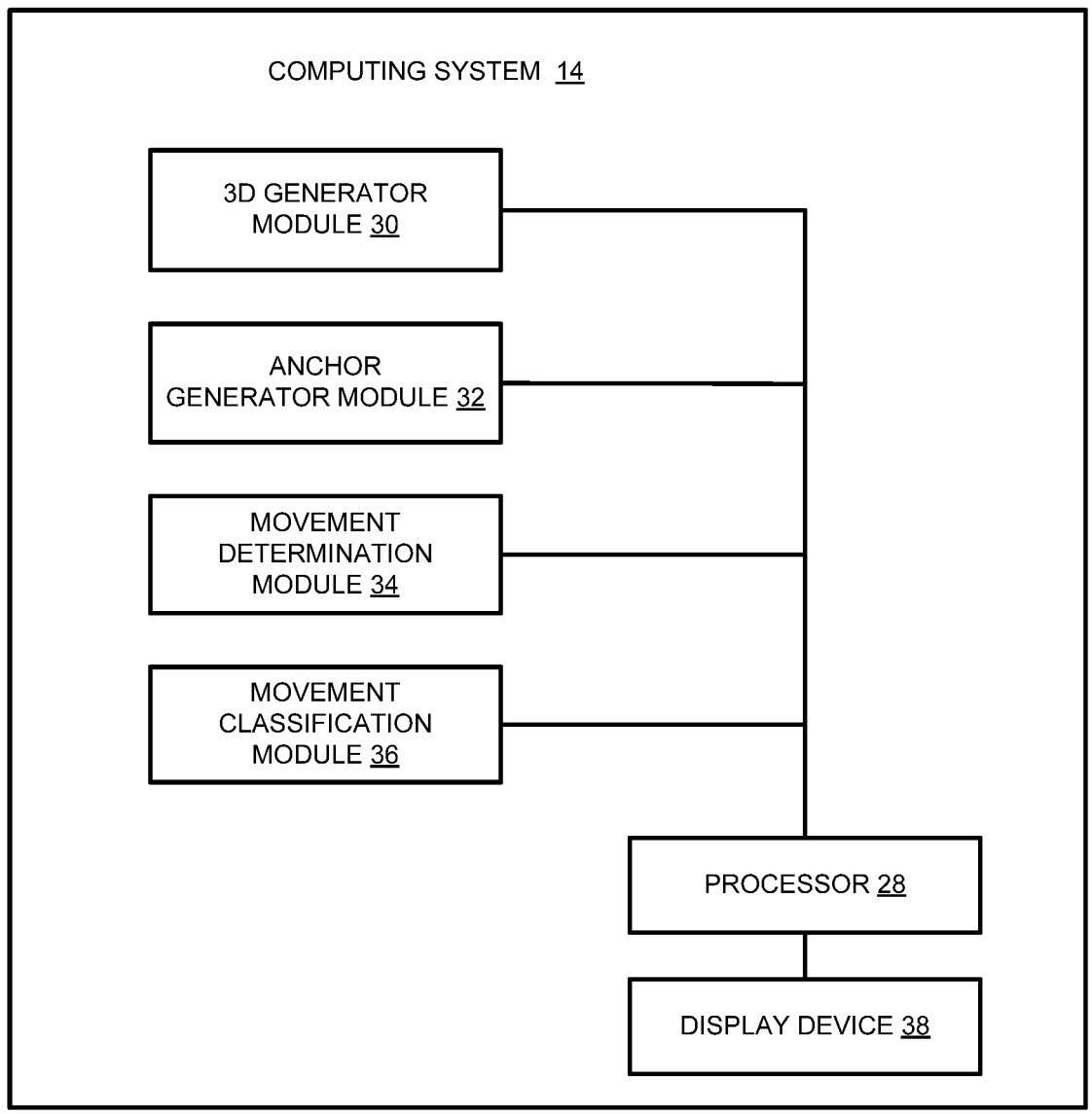
FIG. 4 illustrates various aspects of a computing system.

FIG. 4 illustrates various aspects of the computing system 14. As shown in FIG. 4, the computing system 14 may include one or more processors 28, a 3D generator module 30, an electronic anchor generator module 32, a distance determination module 34, a movement classification module 36 and a display device 38. Each of the modules 30-36 may be communicably connected to the processor 28 and to one another. Although only one processor 28 and one display device 38 is shown in FIG. 4, it will be appreciated that the computing system 14 may include any number of processors 28 and any number of display devices 38. According to various embodiments, the processor 22 and/or the processor 28 includes the functionality to time stamp and synchronize the range sensor data, the camera data, and/or other sensor data.

In various aspects, the 3D generator module 30 is configured to utilize the acquired range sensor data and/or the acquired camera data to generate an electronic/digital three-dimensional model of the mine. According to various aspects, this electronic/digital three-dimensional model of the mine is generated in real-time, in near real-time, or at some point well after the acquisition of the range sensor date and/or camera data. According to various aspects, the electronic/digital three-dimensional model of the mine generated by the 3D generator module 30 is more accurate and/or has a higher resolution than the electronic/digital three-dimensional model of the mine generated by the apparatus 12. According to various aspects, for each time the apparatus 12 passes through the mine (or a portion thereof) and performs a mobile "scan" with the range sensor 16 and/or the camera 20, the 3D generator module 30 can generate another electronic/digital three-dimensional model of the mine based on the acquired range sensor data and/or camera data. The electronic/digital three-dimensional models of the mine can be visually presented by the display device 38.

The electronic anchor module 32 is configured to define a plurality of electronic/digital anchors (shown as "+" signs in FIGS. 6-11) and electronically (1) insert the electronic/digital anchors into, (2) position the electronic/digital anchors within or (3) overlay the electronic/digital anchors onto any number of the electronic/digital three-dimensional models of the mine generated by the 3D generator module 30. For example, according to various aspects, a given electronic/digital anchor may be inserted/positioned/overlaid onto a single electronic/digital three-dimensional model of the mine or onto a plurality of the electronic/digital three-dimensional models of the mine. The electronic anchor module 32 may define and insert/position/overlay any number of electronic/digital anchors onto the electronic/digital three-dimensional models of the mine. For example, in various aspects, the electronic anchor module 32 may define and insert/position/overlay tens, thousands or even tens of thousands of electronic/digital anchors onto any number of the electronic/digital three-dimensional models of the mine generated by the 3D generator module 30.

In contrast to extensometers like the one shown in FIG. 1, the electronic/digital anchors can be placed where actual reference points might be subject to mechanical damage, such as low on a wall, at corners, or at other places where walls can suffer mechanical damage. The electronic/digital anchors are feature vectors, and each electronic/digital anchor uniquely describes an oriented point within one or more of the electronic/digital three-dimensional models of the mine. Stated differently, each electronic/digital anchor has a physical orientation with respect to the electronic/digital three-dimensional models of the mine. A given electronic/digital anchor includes at least one X, Y, Z point in relative or absolute coordinates, an orientation relative to a reference (e.g., angle relative to "vertical", "horizontal", etc.) and may also include one or more unique features which are in close proximity to the X, Y, Z point and are sufficient to uniquely describe the electronic/digital anchor. According to various aspects, the one or more unique features may include, for example, image features, geometric features, topological features, symbolic features, or any combination of these features. Thus, each electronic/digital anchor is described uniquely in space and time (it can be tracked as the oriented X, Y, Z point moves through space and over time) with sufficient resolution as to allow it to be identified across multiple scans of the underground mine obtained over a sufficient period of time to monitor and measure ground movement.

The electronic/digital anchors may be defined in any number of different ways. For example, according to various aspects, a given anchor point (an oriented X, Y, Z point) can be imported into one or more of the electronic three-dimensional models of the mine as the surveyed position of a real reference point in the mine (e.g. a distinctive outcrop of a sidewall of the mine). According to other aspects, a user can utilize the electronic anchor module 32 to create an electronic/digital anchor and insert the created electronic/digital anchor onto a three-dimensional surface of the mine displayed on the display device 38. According to yet other aspects, the electronic anchor module 32 can be configured to automatically create and position electronic/digital anchors every few meters along a tunnel of the mine.

According to various aspects, the electronic anchor module 32 is further configured to define groupings of electronic/digital anchors. Such groupings are shown, for example, as electronic/digital anchors connected by dashed lines in FIGS. 6-11. The electronic anchor module 32 may define any number of different groupings of electronic/digital anchors. For example, according to various aspects, the electronic anchor module 32 may define tens, thousands or even tens of thousands of different groupings of electronic/digital anchors. As described in more detail below, the different groupings may be utilized to more accurately classify the type of movement occurring in the mine.

The movement determination module 34 is configured to automatically determine an occurrence of movement within the mine based on the positions (location and orientation) of the electronic/digital anchors over time relative to the electronic/digital three-dimensional models of the mine. The movement can occur in any portion of the mine, including in a shaft, a tunnel, a stope, etc., and can include a distance component and/or an angle component. For example, according to various aspects, the movement may be determined based on a distance and/or angle (relative to a reference such as "vertical", "horizontal", etc.) a single electronic/digital anchor has moved over time relative to the electronic/digital three-dimensional models of the mine. According to other aspects, the movement may be determined based on the respective distances and/or angles a grouping of electronic/digital anchors have moved over time relative to the electronic/digital three-dimensional models of the mine. According to yet other aspects, the movement may be determined based on the respective distances and/or angles a plurality of different groupings of electronic/digital anchors have moved over time relative to the electronic/digital three-dimensional models of the mine.

It will be appreciated that the position (location and orientation) of a given electronic/digital anchor relative to one of the electronic/digital three-dimensional models of the mine can be compared to the position (location and orientation) of the given electronic/digital anchor to a different one of the electronic/digital three-dimensional models of the mine to determine movement of the given electronic/digital anchor. However, the comparison is not necessarily between electronic/digital three-dimensional models of the mine generated based on successive scans. According to various aspects, comparisons can be done between a plurality of electronic/digital three-dimensional models of the mine generated based on successive scans to determine, for example, a rate of change of movement of the given electronic/digital anchor.

With the system 10, a human does not need to physically take the distance measurement like with a contact extensometer, thereby allowing the system 10 to take many more distance and angle measurements in a much shorter time frame. Examples of different determined distances include sidewall-to-sidewall distances of a cross-section, ceiling-to-floor distances of a cross-section, longitudinal distances, "hidden or buried" distances, elevation changes, etc., some of which are described in more detail hereinbelow with respect to FIGS. 6-11. In contrast to an extensometer like the one in FIG. 1, where the relative distance between two points is a linear measurement, the movement determination module 34 is configured to make this relative measurement in a full six degrees of freedom.

According to various aspects, the movement determination module 34 is also configured to automatically determine distances and angles between different tunnels (e.g., between adjacent or distant tunnels) of a mine and/or automatically determine the size/geometry of any pillars in the mine. According to various aspects, as set forth above, the movement determination module 34 is also configured to determine an angle (e.g., relative to an external reference such as "vertical") a given electronic/digital anchor has moved over time relative to the electronic/digital three-dimensional models of the mine, the respective angles a grouping of electronic/digital anchors have moved over time relative to the electronic/digital three-dimensional models of the mine, and the respective angles a plurality of groupings of electronic/digital anchors have moved over time relative to the electronic/digital three-dimensional models of the mine. According to various aspects, a distance a given electronic/digital anchor has moved relative to the electronic/digital three-dimensional models of the mine may be along an azimuth and bearing with respect to an internal coordinate frame of the range sensor 18. Additionally, in various aspects the movement determination module 34 is also configured to determine a distance a given electronic/digital anchor has moved relative to the electronic/digital three-dimensional models of the mine along an azimuth and a bearing from a sensor mounted on the apparatus 12 or the mobile platform 26 in proximity to the ego-motion sensor and/or cameras 20.

The movement classification module 36 is configured to determine the type of movement (convergence, subsidence or general movement), if any, within the mine based on the determined respective movements of the electronic/digital anchors relative to the electronic/digital three-dimensional models of the mine. The respective determined movements (distances and/or angles relative to the electronic/digital three-dimensional models of the mine) of any number of electronic/digital anchors may be utilized by the movement classification module 36 to classify the type of movement. By utilizing the electronic/digital anchors over multiple scans, the system 10 is able to detect, measure and classify a wide variety of types of movement. Furthermore, by utilizing respective movement measurements of unique groupings/combinations of electronic/digital anchors, the system 10 is able to measure and properly classify types of movement which are not possible with prior art apparatuses, systems or methods.

The modules 30-36 may be implemented in hardware, firmware, software and combinations thereof. For aspects utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The modules 30-36 (e.g., software application, computer program) may be stored on a computer-readable medium (e.g., disk, device, and/or propagated signal) such that when a computer reads the medium, the functions described herein are performed. According to various aspects, the above-described functionality of the modules may be combined into fewer modules, distributed differently amongst the modules, spread over additional modules, etc. Additionally, one or more the modules 30-36 (or the functionality of one or more of the modules 30-36) may be incorporated into the apparatus 12.

Figure 5:
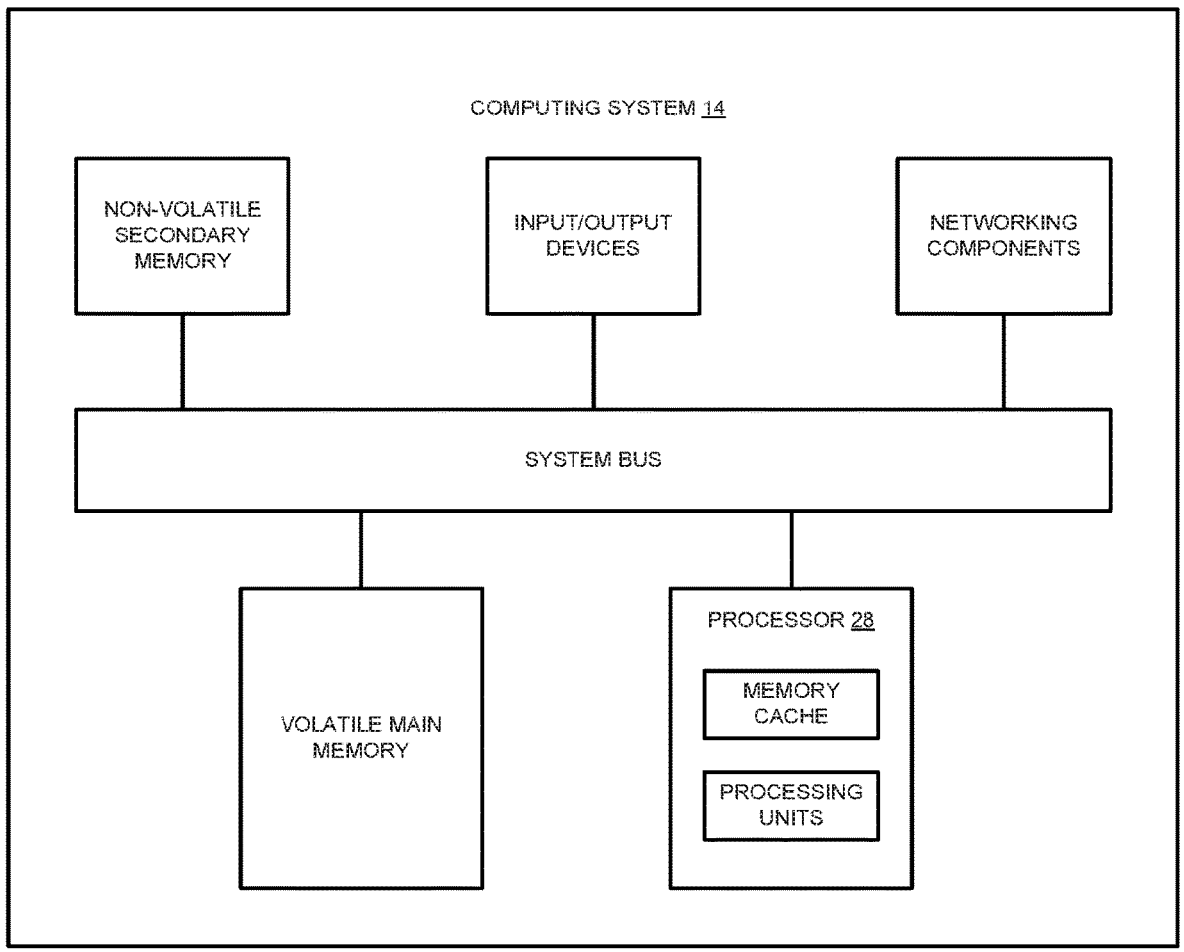
FIG. 5 illustrates additional aspects of the computing system of FIG. 4.

FIG. 5 illustrates additional aspects of the computing system 14. The computing system 14 may be embodied as one or more computing devices, and includes networking components such as Ethernet adapters, non-volatile secondary memory such as magnetic disks, input/output devices such as keyboards and visual displays, volatile main memory, and one or more processors 28. Each of these components may be communicably connected via a common system bus. The processor 28 includes processing units and on-chip storage devices such as memory caches. Although only one processor 28 is shown in FIG. 5, it will be appreciated that the computing system 14 may include any number of processors 28.

According to various aspects, the computing system 12 includes one or more modules which are implemented in software, and the software is stored in non-volatile memory devices while not in use. When the software is needed, the software is loaded into volatile main memory. After the software is loaded into volatile main memory, the processor 28 reads software instructions from volatile main memory and performs useful operations by executing sequences of the software instructions on data which is read into the processor 28 from volatile main memory. Upon completion of the useful operations, the processor 28 writes certain data results to volatile main memory.

Figure 6:
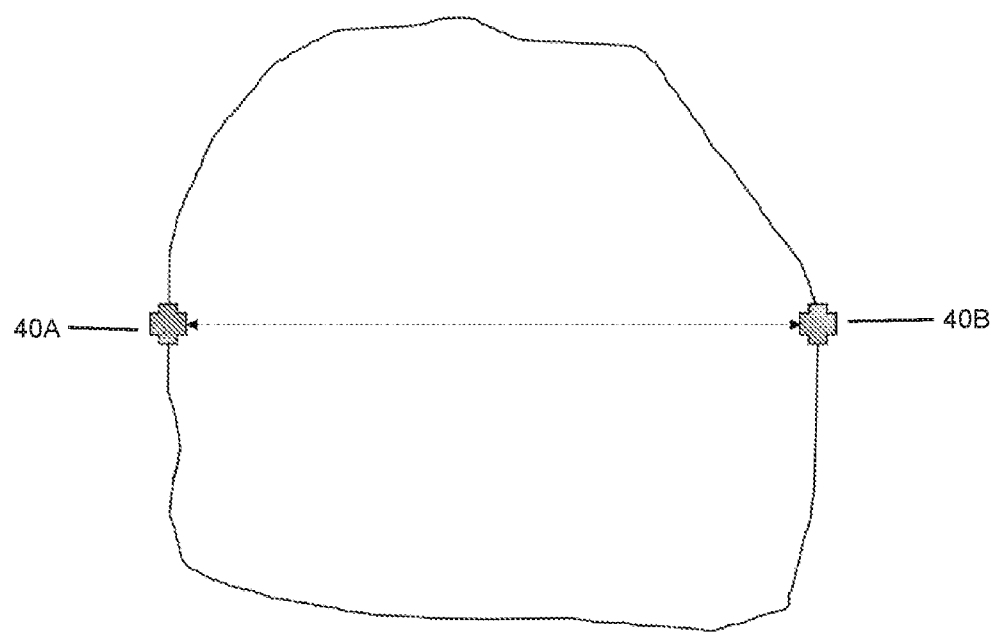
FIG. 6 illustrates a cross-section of a mine which includes two electronic anchors positioned on opposite sidewalls of the mine.

FIG. 6 illustrates a cross-section of a mine which includes two electronic/digital anchors 40A, 40B positioned on opposite sidewalls of the mine. A distance between the two electronic/digital anchors 40A, 40B at a point in time is shown as a dashed line and is representative of a traditional, differential measurement of sidewall convergence. If one or both of the electronic/digital anchors 40A, 40B move over time (relative to the electronic/digital three-dimensional models of the mine), data from one or more subsequent scans of the mine will reflect this movement and the computing system 14 will utilize the change in distance and/or angle to determine the type of movement which has taken place at this area of the mine. In this regard, it will be appreciated that a given "pair" of electronic/digital anchors may be considered as part of a virtual extensometer which measures a change in distance between surfaces in a mine.

Figure 7:
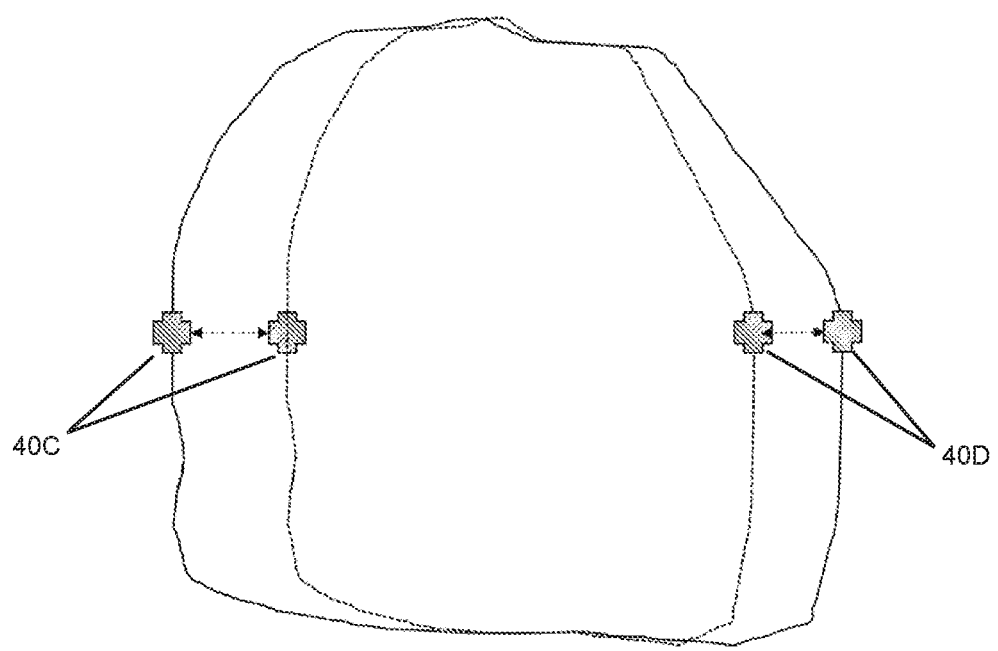
FIG. 7 illustrates a cross-section of a mine which includes two electronic anchors positioned on opposite sidewalls of the mine at two different points in time.

FIG. 7 illustrates a cross-section of a mine which includes two electronic/digital anchors 40C, 40D positioned on opposite sidewalls of the mine at two different points in time. The "outer" cross-section shows the two electronic/digital anchors 40C, 40D at a first point in time and the "inner" cross-section shows the same two electronic/digital anchors 40C, 40D at a second point in time after convergence has occurred. The distance the first electronic/digital anchor 40C has moved over time and the distance the second electronic/digital anchor 40D has moved over time are shown as respective dashed lines. After convergence, the position of the electronic/digital anchors 40C, 40D at the second point in time can be compared to/measured against the position of the electronic/digital anchors 40C, 40D at the first point in time, creating a differential measurement of movement.

Figure 8:
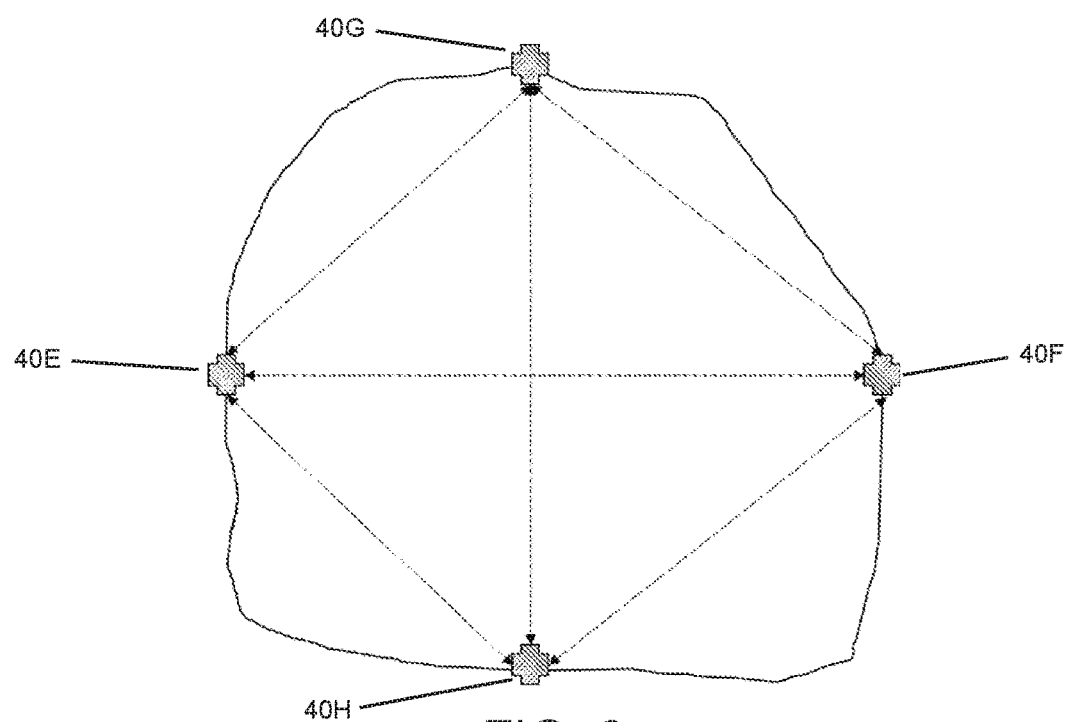
FIG. 8 illustrates a cross-section of a mine which includes four electronic anchors positioned on four surfaces of the mine.

FIG. 8 illustrates a cross-section of a mine which includes four electronic/digital anchors 40E, 40F, 40G, 40H positioned on four surfaces of the mine. A first electronic/digital anchor 40E is positioned on a first sidewall of the mine, a second electronic/digital anchor 40F is positioned on a second sidewall of the mine opposite the first electronic/digital anchor 40E, a third electronic/digital anchor 40G is positioned on a ceiling of the mine and a fourth electronic/digital anchor 40H is positioned on a floor of the mine opposite the third electronic/digital anchor 40G. The six distances between the four electronic/digital anchors 40E, 40F, 40G, 40H at a point in time are shown as respective dashed lines. One of the dashed lines is representative of a traditional, differential measurement of sidewall convergence, one of the dashed lines is representative of a traditional, differential measurement of roof-floor subsidence, and the other four dashed lines are representative of crossover, differential measurements that can be used to further resolve ground motion components into their underlying geotechnical cause. If one or more of the electronic/digital anchors 40E, 40F, 40G, 40H move over time (relative to the electronic/digital three-dimensional models of the mine), data from one or more subsequent scans of the mine will reflect this movement and the computing system 14 will utilize the respective changes in distance and/or angle to determine the type of movement which has taken place at this area of the mine. By utilizing respective changes in distances and/or angles for various groupings/combinations of electronic/digital anchors such as the ones shown in FIG. 8, the computing system 14 is able to more accurately describe any structural changes which occur in this area of the mine.

Figure 9:
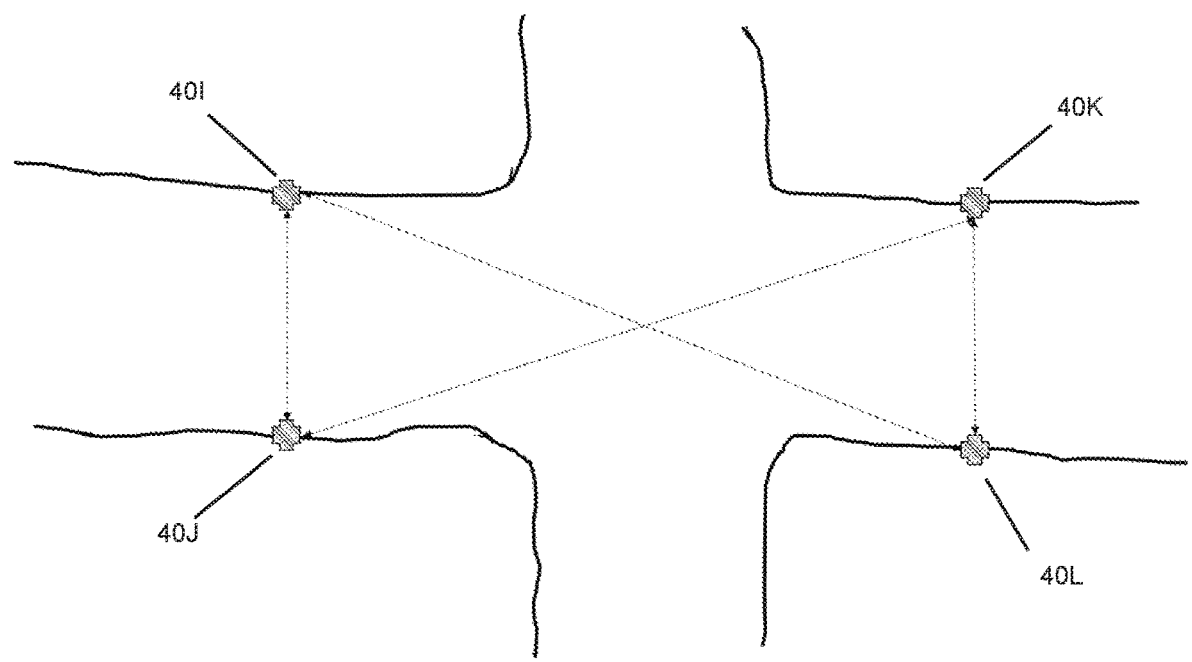
FIG. 9 illustrates a plan view of a mine which includes four electronic anchors.

FIG. 9 illustrates a plan view of a mine which includes four electronic/digital anchors 40I, 40J, 40K, 40L. A first electronic/digital anchor 40I is positioned on a first sidewall of the mine, a second electronic/digital anchor 40J is positioned on a second sidewall of the mine opposite the first electronic/digital anchor 40I, a third electronic/digital anchor 40K is positioned on a third sidewall of the mine and a fourth electronic/digital anchor 40L is positioned on a fourth sidewall of the mine opposite the third electronic/digital anchor 40K. Four of the distances between the four electronic/digital anchors 40I, 40J, 40K, 40L at a point in time are shown as respective dashed lines. As shown by the four dashed lines, the respective electronic/digital anchors in a given grouping/combination of electronic/digital anchors utilized to classify movement in the mine can be positioned in different cross-sections or different areas of the mine. The four distances shown in FIG. 9 include two cross-sectional distances and two longitudinal distances. If one or more of the electronic/digital anchors 40I, 40J, 40K, 40L move over time (relative to the electronic/digital three-dimensional models of the mine), one or more subsequent scans of the mine will reflect this movement and the computing system 14 will utilize the respective changes in distance and/or angle to determine the type of movement which has taken place at this area of the mine. By utilizing both cross-sectional movement and longitudinal movement, the computing system 14 is better able to describe any structural changes which occur in this area of the mine. For example, by utilizing the arrangement shown in FIG. 9, the computing system 14 can determine convergence within the cross-section as well as more general mine movement that includes longitudinal components.

Figure 10:
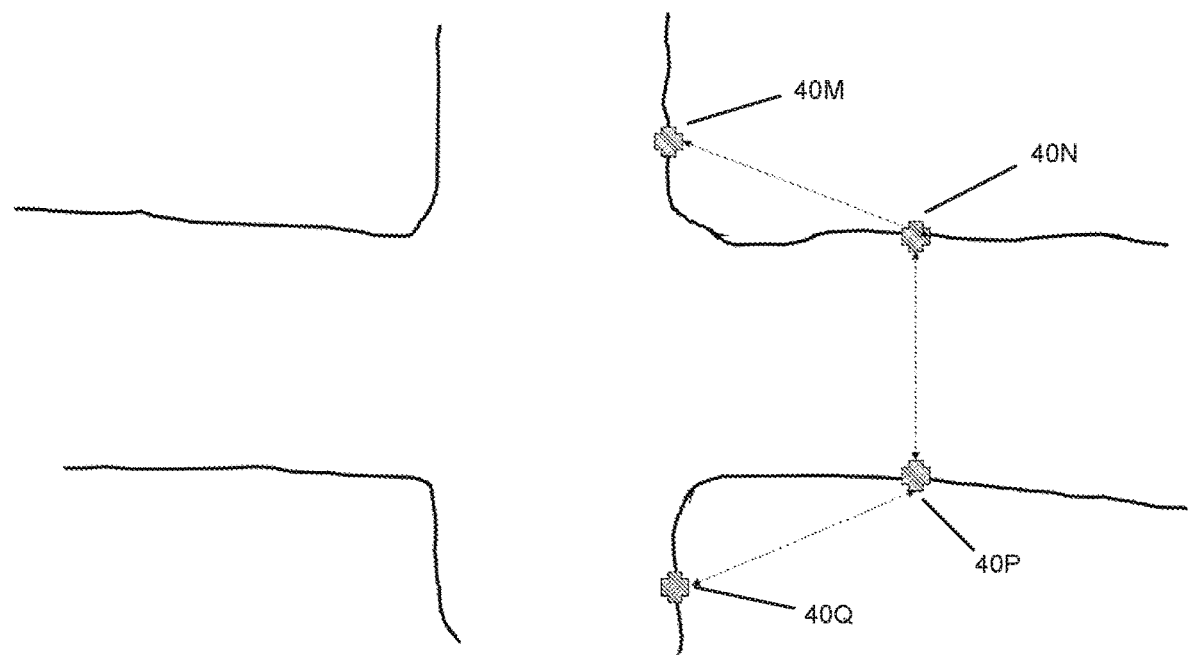
FIG. 10 illustrates a plan view of a mine which includes four electronic anchors.

FIG. 10 illustrates a plan view of a mine which includes four electronic/digital anchors 40M, 40N, 40P, 40Q. A first electronic/digital anchor 40M is positioned on a first sidewall of the mine, a second electronic/digital anchor 40N is positioned on a second sidewall of the mine, a third electronic/digital anchor 40P is positioned on a third sidewall of the mine opposite the second electronic/digital anchor 40N and a fourth electronic/digital anchor 40Q is positioned on a fourth sidewall of the mine. The three distances between the four electronic/digital anchors 40M, 40N, 40P, 40Q at a point in time are shown as dashed lines. As shown by the three dashed lines, the pairing/grouping of electronic/digital anchors is not restricted to "line-of-sight" pairings/groupings. For example, whereas the distance component of movement associated with the second electronic/digital anchor 40N and/or the third electronic/digital anchor 40P resembles a distance which could be physically measured with a contact extensometer like the one shown in FIG. 1, the distance component of movement associated with the first electronic/digital anchor 40M and/or the second electronic/digital anchor 40N and the distance between the third electronic/digital anchor 40P and fourth electronic/digital anchor 40Q could not be physically measured with a contact extensometer like the one shown in FIG. 1. By utilizing both cross-sectional movement and "hidden or buried" movement, the computing system 14 is better able to describe any structural changes which occur in this area of the mine. For example, by utilizing the arrangement shown in FIG. 10, the computing system 14 can determine convergence within the cross-section as well as more general mine movement within the internal geometry of the rock mass of the mine.

Figure 11:
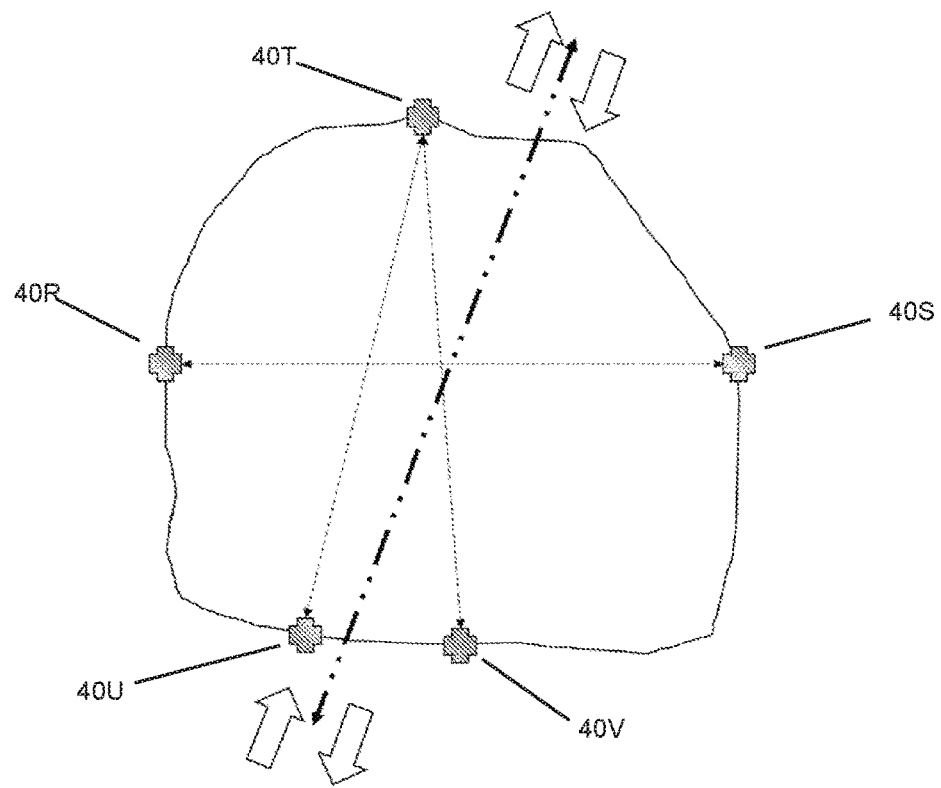
FIG. 11 illustrates a cross-section of a mine which includes a fault line between two rock formations and five electronic anchors.

FIG. 11 illustrates a cross-section of a mine which includes a fault line between two rock formations and five electronic/digital anchors 40R, 40S, 40T, 40U, 40V. A first electronic/digital anchor 40R is positioned on a first sidewall of the mine, a second electronic/digital anchor 40S is positioned on a second sidewall of the mine opposite the first electronic/digital anchor 40R, a third electronic/digital anchor 40T is positioned on a ceiling of the mine, a fourth electronic/digital anchor 40U is positioned on a floor of the mine on a first side of the fault line and a fifth electronic/digital anchor 40V is positioned on the floor of the mine on an opposite side of the fault line. It will be appreciated that the fault line, which is shown as a "dash-double dot" line in FIG. 11, is an intersection of two rock formations of the mine. For example, the first rock formation is to the "left" of the fault line and the second rock formation is to the "right" of the fault line. The three distances between the five electronic/digital anchors 40R, 40S, 40T, 40U, 40V at a point in time are shown as dashed lines. One of the dashed lines is representative of a traditional, differential measurement of sidewall convergence, one of the dashed lines is representative of a traditional, differential measurement of roof-floor subsidence, and the other dashed line is representative of a measurement of the movement of the first and/or second rock formations along the fault line.

The arrangement of electronic/digital anchors 40R, 40S, 40T, 40U, 40V shown in FIG. 11 allows the system 10 to measure and distinguish between any convergence, subsidence and/or movement along a fault line which occurs in the mine over time, and is just one example of many different ways that the electronic/digital anchors can be arranged and utilized to measure simple as well as complex movement, further resolve ground motion components into their underlying geotechnical causes and properly classify the type of movement which has occurred. Thus, it will be appreciated that at least some of the groupings/combinations of the electronic/digital anchors associated with the electronic/digital three-dimensional models of the mine can be utilized to "couple" at least some of the electronic/digital anchors to geological features of the mine. If one or more of the electronic/digital anchors 40R, 40S, 40T, 40U, 40V moves over time (relative to the electronic/digital three-dimensional models of the mine), data from one or more subsequent scans of the mine will reflect this movement and the computing system 14 will utilize respective changes in distance and/or angle to determine the type of movement which has taken place at this area of the mine. Without the arrangement shown in FIG. 11, prior art apparatuses, systems or methods can easily confuse movement of one or more rock formations along the fault line in either direction with traditional convergence and/or subsidence.

In operation, as the mobile platform 26 makes subsequent passes through the mine, the system 10 acquires subsequent range sensor data and/or images of the interior of the mine (camera data) and/or other data representative of the mine and generates subsequent electronic three-dimensional models of the mine based on the subsequently acquired data. A plurality of movement "measurements" can be determined from the information provided with each scan. The subsequent electronic/digital three-dimensional models of the mine can be absolute or relative to the original three-dimensional model (or to the most recently generated electronic/digital three dimensional model). For instances where the electronic/digital three-dimensional models of the mine are absolute, it is automatically aligned with or registered against a baseline survey (e.g., the originally generated electronic/digital three-dimensional model of the mine). This baseline can be a dense point cloud or mesh, or can be just a set of points (sparse) strung out at intervals over the mine span.

The computing system 14 is configured to utilize the subsequently acquired data to determine movement of any of the electronic/digital anchors relative to the electronic/digital three-dimensional models of the mine, and to determine the amount and type of movement which has occurred. The computing system 14 also utilizes the data to determine a distance and/or angle (relative to a reference) the tunnel surface has moved between two different data collection times. Due to the automatic alignment or registration described above, subsequent movement determinations for any groupings/combinations of electronic/digital anchors are determined relative to the same frame of reference. Additionally, according to various aspects, the computing system 14 is further configured to transfer "measurement/movement" data to another computing system (a computing system of a customer) for importation into the customer's software. The imported data can then be acted on in a way identical or similar to the way measurements from an extensometer like the one shown in FIG. 1 are acted on after they are entered into the customer's software. The amount of data that needs to be transferred by the computing system 14 to a customer is vastly smaller than a full colorized point cloud or mesh.

In view of the above, it will be appreciated that the system 10 described herein relates generally to movement detection in underground mines and specifically to the classification of identified movement as convergence, subsidence, movement along a fault line, generalized mine movement, general change and combinations thereof. Furthermore, the system 10 relates to the measurement of the identified and classified movement with respect to models that accurately capture the ground movement. For example, the system 10 enables the discrimination between traditional sidewall convergence, roof-floor subsidence, and more generalized forms of mine movement such as movement of rock formations along a fault line.

EXAMPLES

Example 1

A system for measuring geometric change in a subterranean structure is provided. The system comprises an apparatus couplable to a mobile platform, and a computing system communicably couplable to the apparatus. The apparatus comprises a sensor configured to acquire data representative of a geometry of the subterranean structure and/or a camera configured to capture images of an interior of the subterranean structure, and a processing circuit communicably couplable to the sensor and/or the camera. The computing system comprises at least one processor, a 3D generator module communicably couplable to the at least one processor, an anchor module communicably couplable to the at least one processor, a movement determination module communicably couplable to the at least one processor and a movement classification module communicably couplable to the at least one processor. The 3D generator module is configured to generate a digital three-dimensional model of the subterranean structure. The anchor module is configured to define a plurality of digital anchors associated with the subterranean structure. The movement determination module is configured to determine a movement of at least one of the digital anchors. The movement classification module is configured to determine a type of movement within the subterranean structure based on the determined movement of the at least one of the digital anchors.

Example 2

The system of Example 1, wherein the subterranean structure comprises a mine, a tunnel, a cave, a bunker or a conduit.

Example 3

The system of Examples 1 or 2, wherein the sensor comprises a laser rangefinder, a radar module, an ultrasonic ranging module or a sonar module.

Example 4

The system of Examples 1, 2 or 3, wherein the camera comprises a single lens camera, a stereo camera or a structured light three-dimensional scanner.

Example 5

The system of Examples 1, 2, 3 or 4, wherein the apparatus further comprises a plurality of sensors and/or a plurality of cameras.

Example 6

The system of Examples 1, 2, 3, 4 or 5, wherein the processing circuit is configured to time stamp data acquired by the sensor and/or images captured by the camera.

Example 7

The system of Example 6, wherein the processing circuit is further configured to determine an ego-motion estimate of the camera.

Example 8

The system of Example 7, wherein the determined ego motion estimate comprises an incremental estimate and a multi-frame estimate.

Example 9

The system of Examples 7 or 8, wherein the processing circuit is further configured to perform bundle adjustment on the determined ego-motion estimate.

Example 10

The system of Examples 1, 2, 3, 4, 5, 6, 7, 8 or 9, wherein the processing circuit is further configured to dynamically control adjustment of the sensor and/or the camera.

Example 11

The system of Examples 1, 2, 3, 4, 5, 6, 7, 8, 9 or 10, wherein the apparatus further comprises a memory device.

Example 12

The system of Examples 1, 2, 3, 4, 5, 6, 7, 8, 9, 10 or 11, wherein at least one of the plurality of digital anchors comprises an oriented X, Y, Z point in a three-dimensional coordinate system.

Example 13

The system of Examples 1, 2, 3, 4, 5, 6, 7, 8, 9, 10, 11 or 12, wherein the at least one of the plurality of digital anchors further comprises an image feature, a geometric feature, a topological feature and/or a symbolic figure.

Example 14

The system of Examples 1, 2, 3, 4, 5, 6, 7, 8, 9, 10, 11, 12 or 13, wherein the movement determined by the movement determination module comprises (1) a distance the at least one of the digital anchors has moved over time relative to the digital three-dimensional model of the subterranean structure and (2) an angle the at least one of the digital anchors has moved over time relative to a reference.

Example 15

An apparatus for measuring geometric change in a subterranean structure is provided. The apparatus comprises a sensor configured to acquire data representative of a geometry of the subterranean structure while the sensor is moving through the subterranean structure and/or a camera configured to capture images of an interior of the subterranean structure while the camera is moving through the subterranean structure, and a processor. The processor is configured to generate digital three-dimensional models of the subterranean structure based on data acquired by the sensor and/or images captured by the camera, define a plurality of digital anchors associated with the subterranean structure, determine a movement of at least one of the plurality of digital anchors relative to the digital three-dimensional models of the subterranean, and determine a type of movement within the subterranean structure based on the determined movement of the at least one of the plurality of digital anchors. The at least one of the plurality of digital anchors comprises an oriented X, Y, Z point in a three-dimensional coordinate system.

Example 16

The apparatus of Example 15, wherein the at least one of the plurality of digital anchors comprises a feature vector.

Example 17

The apparatus of Examples 15 or 16, wherein the movement determined by the movement determination module comprises (1) a distance the at least one of the digital anchors has moved over time relative to the digital three-dimensional model of the subterranean structure and/or (2) an angle the at least one of the digital anchors has moved over time relative to a reference.

Example 18

A system for measuring geometric change in a subterranean structure over time is provided. The system comprises an apparatus couplable to a mobile platform, one or more processors and one or more modules. The mobile platform is configured to move through the subterranean structure at different times. The apparatus comprises at least one sensor configured to acquire data representative of a geometry of the subterranean structure while the mobile platform is moving through the subterranean structure and/or at least one camera configured to capture a plurality of images of an interior of the subterranean structure while the mobile platform is moving through the subterranean structure. The one or more modules are configured to (1) generate a plurality of digital three-dimensional models of the subterranean structure, wherein each of the plurality of digital three-dimensional models are generated at different times, (2) generate a plurality of digital anchors associated with the subterranean structure, wherein at least two of the plurality of digital anchors comprises an oriented X, Y, Z point in a three-dimensional coordinate system, (3) define at least one group comprising the at least two of the plurality of digital anchors, (4) determine a movement of the at least two of the plurality of anchors relative to each other and (5) determine a type of movement within the subterranean structure based the determined movement of the at least two digital anchors.

Example 19

The system of Example 18, wherein the at least two of the plurality of digital anchors comprise different feature vectors.

Example 20

The system of Examples 18 or 19, wherein the movement determined by the processor comprises (1) a distance one of the at least two of the plurality of digital anchors has moved over time relative to at least one of the subsequent digital three-dimensional models of the subterranean structure and/or (2) an angle one of the at least two of the plurality of digital anchors has moved over time relative to a reference.

Although the various aspects of the system 10 have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system for measuring geometric change in a subterranean structure, the system comprising:
    an apparatus couplable to a mobile platform, wherein the apparatus comprises:
        at least one of the following:
            a sensor configured to acquire data representative of a geometry of the subterranean structure; and
            a camera configured to capture images of an interior of the subterranean structure; and
        a processing circuit communicably couplable to at least one of the following:
            the sensor; and
            the camera; and
    a computing system communicably couplable to the apparatus, wherein the computing system comprises:
        at least one processor;
        a 3D generator module communicably couplable to the at least one processor, wherein the 3D generator module is configured to generate a digital three-dimensional model of the subterranean structure;
        an anchor module communicably couplable to the at least one processor, wherein the anchor module is configured to define a plurality of digital anchors associated with the subterranean structure;
        a movement determination module communicably couplable to the at least one processor, wherein the movement determination module is configured to determine a movement of at least one of the digital anchors; and a movement classification module communicably couplable to the at least one processor, wherein the movement classification module is configured to determine a type of movement within the subterranean structure based on the determined movement of the at least one of the digital anchors, wherein the type of movement comprises at least one of the following:
  convergence;
  subsidence;
  movement along a fault line;
  cross-sectional movement;
  longitudinal movement; and
  hidden movement.

2. The system of claim 1, wherein the subterranean structure comprises one of the following:
  a mine;
  a tunnel;
  a cave;
  a bunker; and
  a conduit.

3. The system of claim 1, wherein the sensor comprises one of the following:
  a laser rangefinder;
  a radar module;
  an ultrasonic ranging module; and
  a sonar module.

4. The system of claim 1, wherein the camera comprises one of the following:
  a single lens camera;
  a stereo camera; and
  a structured light three-dimensional scanner.

5. The system of claim 1, wherein the apparatus further comprises at least one of the following:
  a plurality of sensors; and
  a plurality of cameras.

6. The system of claim 1, wherein the processing circuit is configured to time stamp at least one of the following:
  data acquired by the sensor; and
  images captured by the camera.

7. The system of claim 6, wherein the processing circuit is further configured to determine an ego-motion estimate of the camera.

8. The system of claim 7, wherein the determined ego motion estimate comprises an incremental estimate and a multi-frame estimate.

9. The system of claim 7, wherein the processing circuit is further configured to perform bundle adjustment on the determined ego-motion estimate.

10. The system of claim 1, wherein the processing circuit is further configured to dynamically control adjustment of at least one of the following:
  the sensor; and
  the camera.

11. The system of claim 1, wherein the apparatus further comprises a memory device.

12. The system of claim 1, wherein at least one of the plurality of digital anchors comprises an oriented X, Y, Z point in a three-dimensional coordinate system.

13. The system of claim 1, wherein the at least one of the plurality of digital anchors further comprises at least one of the following:
  an image feature;
  a geometric feature;
  a topological feature; and
  a symbolic figure.

14. The system of claim 1, wherein the movement determined by the movement determination module comprises:
  a distance the at least one of the digital anchors has moved over time relative to the digital three-dimensional model of the subterranean structure; and
  an angle the at least one of the digital anchors has moved over time relative to a reference.

15. An apparatus for measuring geometric change in a subterranean structure, the apparatus comprising:
  at least one of the following:
    a sensor configured to acquire data representative of a geometry of the subterranean structure while the sensor is moving through the subterranean structure; and
    a camera configured to capture images of an interior of the subterranean structure while the camera is moving through the subterranean structure; and
  a processor configured to:
    generate digital three-dimensional models of the subterranean structure based on at least one of the following:
      data acquired by the sensor; and
      images captured by the camera;
    define a plurality of digital anchors associated with the subterranean structure;
    determine a movement of at least one of the plurality of digital anchors relative to the digital three-dimensional models of the subterranean, wherein the at least one of the plurality of digital anchors comprises an oriented X, Y, Z point in a three-dimensional coordinate system; and
    determine a type of movement within the subterranean structure based on the determined movement of the at least one of the plurality of digital anchors, wherein the type of movement comprises at least one of the following:
      convergence;
      subsidence;
      movement along a fault line;
      cross-sectional movement;
      longitudinal movement; and
      hidden movement.

16. The apparatus of claim 15, wherein the at least one of the plurality of digital anchors comprises a feature vector.

17. The apparatus of claim 15, wherein the movement determined by the movement determination module comprises:
  a distance the at least one of the digital anchors has moved over time relative to the digital three-dimensional model of the subterranean structure; and
  an angle the at least one of the digital anchors has moved over time relative to a reference.

18. A system for measuring geometric change in a subterranean structure over time, the system comprising:
  an apparatus couplable to a mobile platform, wherein the mobile platform is configured to move through the subterranean structure at different times, wherein the apparatus comprises:
    at least one of the following:
      at least one sensor, wherein the at least one sensor is configured to acquire data representative of a geometry of the subterranean structure while the mobile platform is moving through the subterranean structure;
      at least one camera configured to capture a plurality of images of an interior of the subterranean structure while the mobile platform is moving through the subterranean structure; and one or more processors; and one or more modules configured to:
- generate a plurality of digital three-dimensional models of the subterranean structure, wherein each of the plurality of digital three-dimensional models are generated at different times; and
- generate a plurality of digital anchors associated with the subterranean structure, wherein at least two of the plurality of digital anchors comprises an oriented X, Y, Z point in a three-dimensional coordinate system;
- define at least one group comprising the at least two of the plurality of digital anchors;
- determine a movement of the at least two of the plurality of anchors relative to each other; and
- determine a type of movement within the subterranean structure based the determined movement of the at least two digital anchors, wherein the type of movement comprises at least one of the following:
  - convergence;
  - subsidence;
  - movement along a fault line;
  - cross-sectional movement;
  - longitudinal movement; and
  - hidden movement.

19. The system of claim 18, wherein the at least two of the plurality of digital anchors comprise different feature vectors.

20. The system of claim 18, wherein the movement determined by the processor comprises at least one of the following:
- a distance one of the at least two of the plurality of digital anchors has moved over time relative to at least one of the subsequent digital three-dimensional models of the subterranean structure; and
- an angle one of the at least two of the plurality of digital anchors has moved over time relative to a reference.

* * * * *